United States Patent [19]
Todd

[11] 3,744,021
[45] July 3, 1973

[54] OFFSHORE SEISMIC EXPLORATION METHOD
[75] Inventor: James D. Todd, Houston, Tex.
[73] Assignee: Texaco Inc., New York, N.Y.
[22] Filed: July 13, 1971
[21] Appl. No.: 162,104

[52] U.S. Cl.......... 340/15.5 TC, 340/7, 181/0.5 FS, 340/15.5 CP
[51] Int. Cl................................................ G01v 1/00
[58] Field of Search............. 340/15.5 CP, 15.5 TC, 340/15.5 TD, 7; 181/0.5 VM, 0.5 FS; 346/33 C

[56] References Cited
UNITED STATES PATENTS
3,351,899  11/1967  Luehrmann et al................. 340/7 R
3,602,878  8/1971  Sullivan............................ 340/7 R Primary Examiner—Benjamin A. Borchelt
Assistant Examiner—H. A. Birmiel
Attorney—Thomas H. Whaley et al.

[57] ABSTRACT

A method of carrying out offshore-type seismic exploration. It involves simultaneous running of a deep-reflection profile and a shallow-reflection profile without substantial interference of one with the other.

7 Claims, 5 Drawing Figures

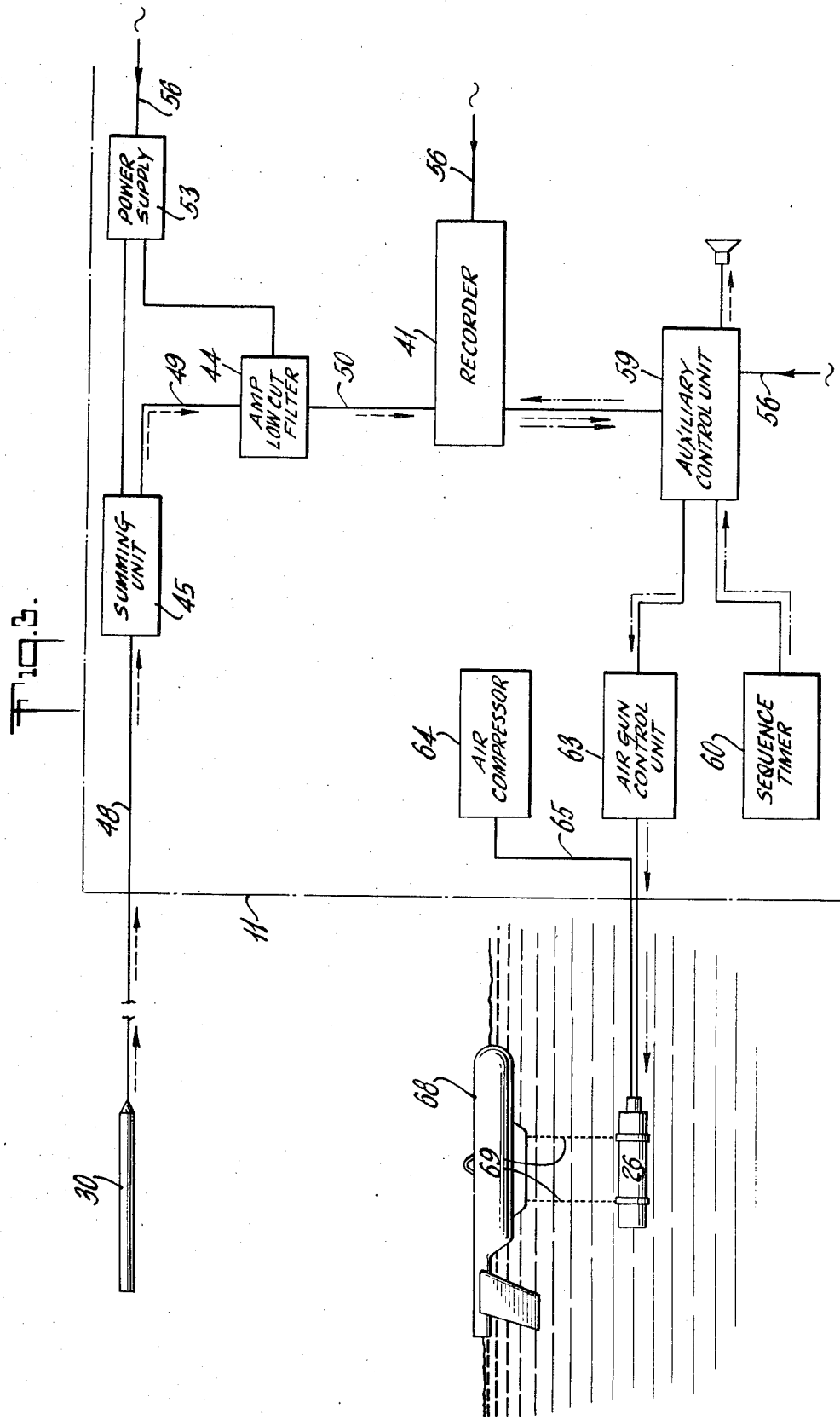

3,744,021

OFFSHORE SEISMIC EXPLORATION METHOD

BACKGROUND OF THE INVENTION

1. Field of the Invention

This invention relates to seismic exploration in general. More specifically, it concerns a method applicable to offshore reflection type seismic operations.

2. Description of the Prior Art

There are various known procedures employed in offshore seismic exploration. One recent development is the use of a so-called air gun as the source of seismic energy to replace earlier use of an explosive. The air gun provides a repeatable discharge of compressed air that acts like an explosive discharge, and for deep-reflection work a pair of large air guns are discharged simultaneously. However, it has not been feasible heretofore to carry out deep-penetration reflection operations and obtain shallow-reflection data at the same time. The deep-reflection operations involve large energy seismic charges in order to obtain desired vertical penetration and this tends to blank the shallow-reflection data. Consequently, prior to this invention it has been necessary for obtaining satisfactory shallow data, to run a separate shallow profile operation. Obviously it is very difficult to have such separately obtained shallow data cover exactly the same profile as was covered by a deep-reflection profile.

Thus, it is an object of this invention to provide a method of operating in such a manner as to carry out simultaneously a deep-reflection seismic profile operation and a shallow-reflection recording procedure so that both are taken along an identical profile line.

SUMMARY OF THE INVENTION

Briefly, the invention concerns offshore seismic exploration and comprises a method of simultaneously firing large energy deep-reflection profile shots, and firing and recording small energy shallow-reflection profile shots without substantial interference of one with the other. It comprises the steps of continuously energizing a shallow-reflection recording unit, and periodically firing said large energy charge in order to record deep-reflection records at time-controlled intervals during traverse of a predetermined profile line. It also comprises firing said small energy charge at predetermined relatively short constant intervals except during the recording of said deep-reflection records, and recording said shallow record shots for the entire short constant time interval after every small energy charge firing.

DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 3 is a schematic block diagram, illustrating a system for carrying out shallow-reflection profile recordings;

DESCRIPTION OF THE PREFERRED EMBODIMENT

Figure 1:
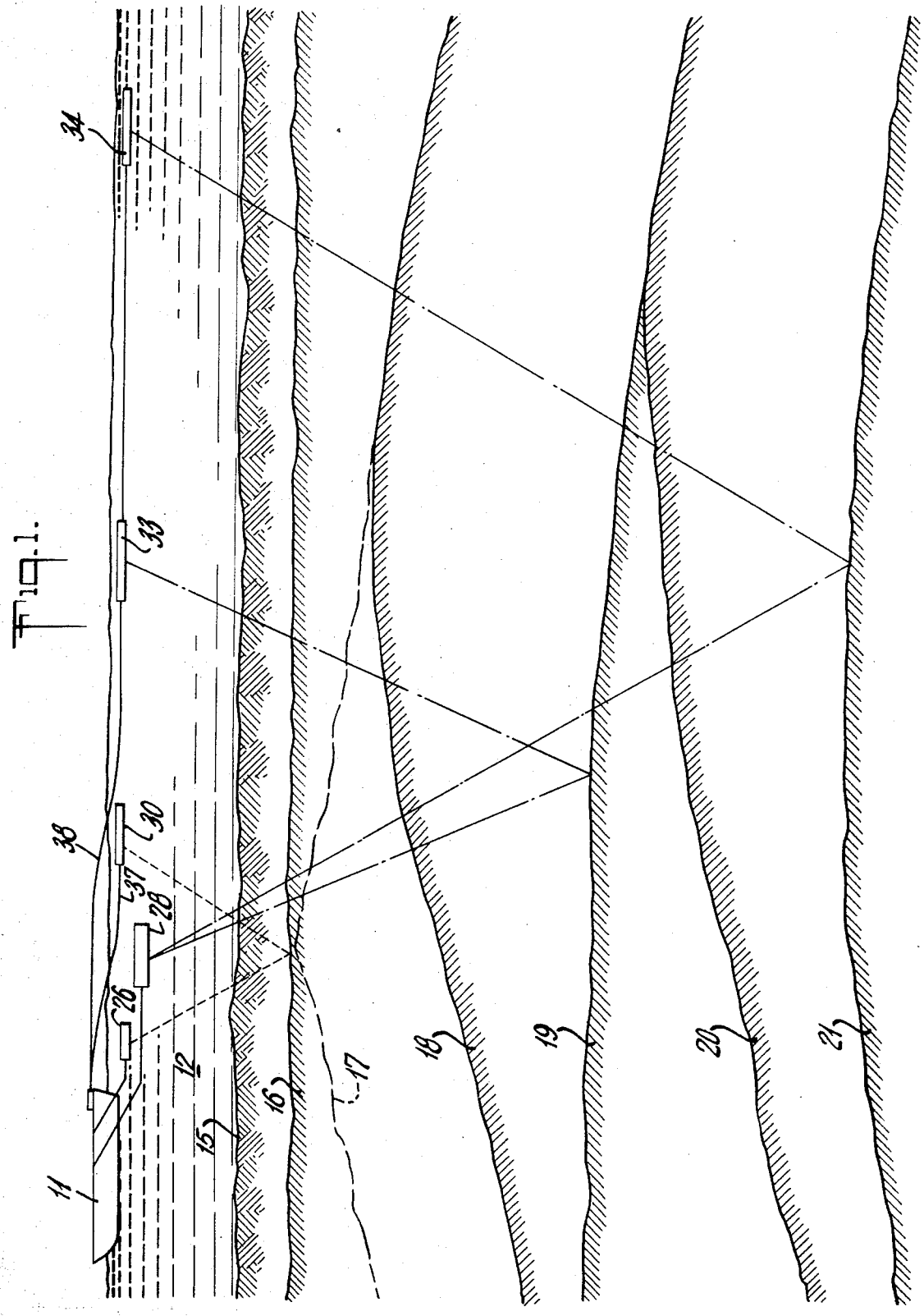
FIG. 1 is a schematic cross-sectional illustration indicating simultaneous operation of deep and shallow seismic reflection operations.

Referring to FIG. 1, it will be understood that equipment for carrying out a method according to this invention, includes a ship 11 operating in a body of water 12. There is a sedimentary layer or bottom 15 which lies under the body of water 12, and there are additional subsurface layers, e.g., layers 16, 17, 18, 19, 20 and 21. These various layers are, of course, changes in density of the subsurface materials, sufficient to provide reflecting surfaces for the seismic energy that is traveling downward from a seismic charge.

Figure 2:
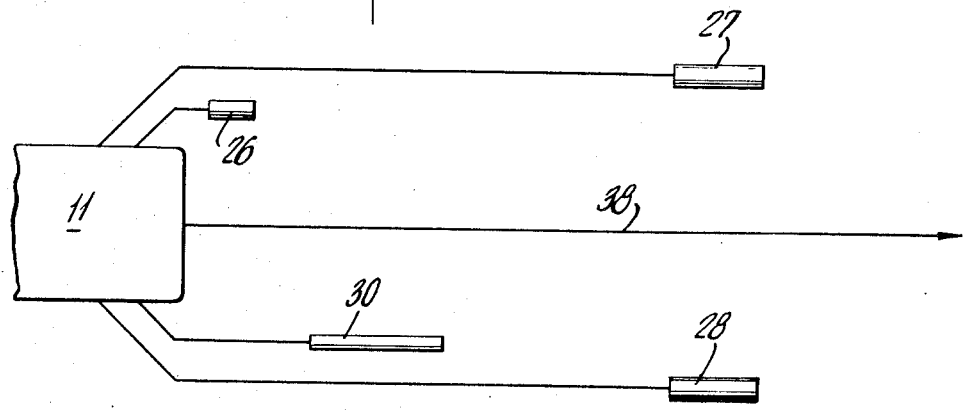
FIG. 2 is a schematic plan view, illustrating a ship towing air guns and seismic detector streamers.

The ship 11 is towing a small energy seismic charge-producing gun 26, as well as a pair of large energy-producing guns 27 and 28 (see FIG. 2). These guns are preferably compressed-air-type of seismic energy-producing guns. They operate repeatably and produce sudden short-duration seismic energy charges by releasing instantaneously a predetermined volume of highly compressed gas which is usually compressed air.

Compressed air guns for this special use have been developed and are available commercially. For example, there is a 10-cubic inch model that is designated "Par-Bolt Air Gun Model 600 B," which is manufactured by Bolt Associates, Inc. of East Norwalk, Conn., U.S.A.

As indicated in FIG. 1, the seismic energy charges which are created at the small gun 26 and at the large guns 27 and 28 simultaneously, will each travel outwardly in all directions from the individual discharge. Downward traveling energy will be partially reflected from the subsurface layers, such as layers 15–21, and return upward and be picked up by seismic detector elements. These detector elements are usually made up of a group of geophones that may be connected electrically in various combinations of polarity and group arrangements, and they are physically arranged in the form of a streamer, such as a group of detectors 30 for the shallow-reflection energy, or a plurality of detector groups 33 and 34 for receiving the deep-reflection energies. It will be understood that the detector groups are towed behind the ship 11. There are cables, such as a cable 37 for the detector group 30, and a cable 38 for the plural groups of detectors 33 and 34. These cables must, of course, include structure (not shown) for adequate strength as well as electrical conductor structure (not shown) for carrying the signals generated by the detector groups, back to the equipment on ship 11.

The usual deep-reflection offshore profile operation includes the timing of large energy seismic charges in a periodic manner as the ship travels along a given profile line under the body of water where the survey is being taken. The timing of these deep charges is controlled so as to produce deep-reflection records at given geographical locations along the profile line. After a given number of deep-reflection records have been made, there is usually a correction made based on navigation before the commencement of a succeeding series of recordings. In this manner the geographical locations of deep record events are accurately determined.

An important aspect of this invention concerns the simultaneous operation in conjunction with the foregoing deep operation, of a shallow-reflection recording system which is schematically illustrated in FIG. 3. This involves a recording unit 41 (see FIG. 3) which is located on the ship 11. This recording unit is continuously energized while being controlled so as to stop the record advance during predetermined recording cycles that follow the inhibition of small gun firings, i.e., gun 26. Such firings are inhibited during a predetermined portion of each of the deep profile recordings. This will be more fully explained hereafter in connection with the FIG. 4 diagram.

Referring again to FIG. 3, it will be observed that the recording unit 41 is connected to the output of a filter 44 which, in turn, is connected to the output of a summing unit 45. The input of unit 45 is connected via an electrical connector 48 to the output from the streamer-containing group of detectors 30. It will be understood, of course, that the connector 48 actually includes a multi-conductor cable to carry signals from the separate geophone circuits, which might vary as indicated above.

In this manner, the geophones or detectors in group 30 will have the electrical signals generated therein, transmitted via the connector 48 to the summing unit 45. Another circuit connector 49 connects the summing unit 45 to the filter 44, while a circuit connector 50 connects to the recorder unit 41.

There is a power supply unit 53 that has outputs connected to the summing unit 45 and to the filter 44. It acts to transform AC power as taken from the ship's supply, to provide low-voltage DC power as required. It will be observed that the ship's power supply is also connected into the other units, in addition to power supply 53, over circuit connectors 56. The AC symbol at the free end of the connectors 56 indicates the nature of this electrical power input.

Figure 5:
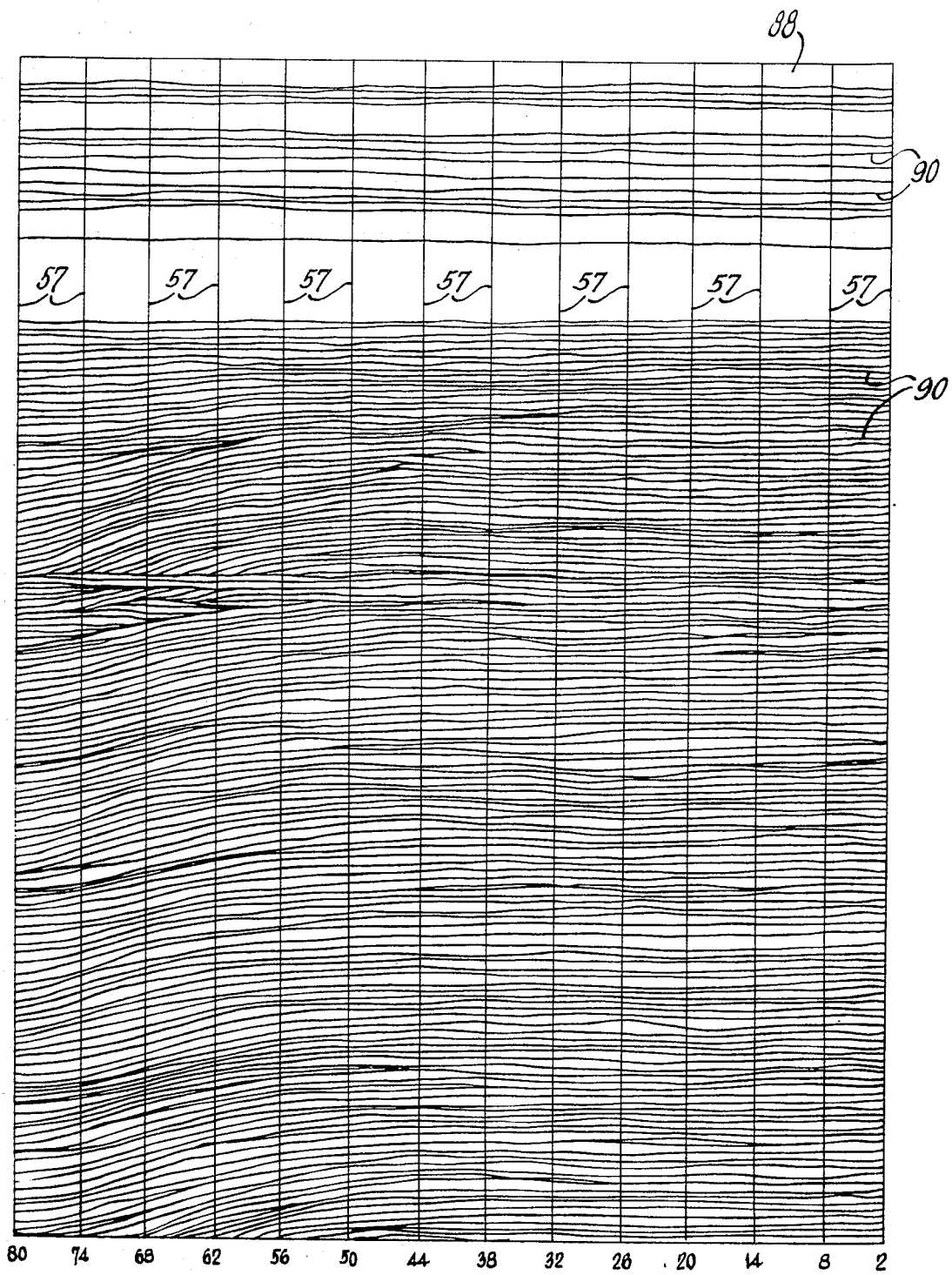
FIG. 5 is an illustration showing a somewhat idealized shallow profile record.

The recording unit 41 might, of course, take different forms. However, it is preferably one that is manufactured by EPC Labs, Inc. of 39 Water Street, Beverly, Mass., U.S.A., 01915, which is designated as "Model 4100 Graphic Recorder." Such recorder employs recording paper having a width of 19 ¾ inches, and the record is a black-on-white presentation with sweep cycles running across the paper in succession. The paper drive may be reversed so that the succession of record sweeps will correspond with a given geographic direction for a profile line being surveyed. This gives the ability to reverse a profile and obtain two records that are readily compared side by side. A typical but somewhat idealized record is shown in FIG. 5. It may be noted that the width of the recording paper is shown in a vertical position, while the paper drive was such that successive sweeps progressed horizontally from right to left and deep-shot events occurred and predetermined ones were marked successively from the right-hand edge toward the left as viewed in FIG. 5. Such events are marked when the paper drive is inhibited, and they appear on the illustrated record as vertical lines 57 in FIG. 5.

It may also be noted that the recorder 41 has a continuous belt (not shown) with three equally spaced styli (not shown) mounted 19 inches apart so that at the start of each new sweep the previous sweeping stylus is just leaving the paper (at the bottom of FIG. 5). As each new sweep is starting, the third stylus is actuating a circuit closure to provide a so-called zero pulse. This is employed to initiate various functions, as desired, including reset of scale lines (not shown) and generation of a key pulse 83 (see FIG. 4), as will be more fully explained below.

The recording unit 41 has its operation controlled by an auxiliary control unit 59 (FIG. 3) which receives input signals from a sequence timer 60 and provides output signals to control actuation of the shallow gun 26 via an air gun control unit 63.

It will be observed that there is an air compressor 64 on board the ship 11 that is connected to the gun 26 by a flexible hose indicated by a line 65. Also, it will be appreciated that the gun 26 is towed so as to be located a predetermined distance beneath the surface of the water 12. This is accomplished by having a buoy 68 with chains or similar attachments 69 to support the gun beneath the buoy.

Figure 4:
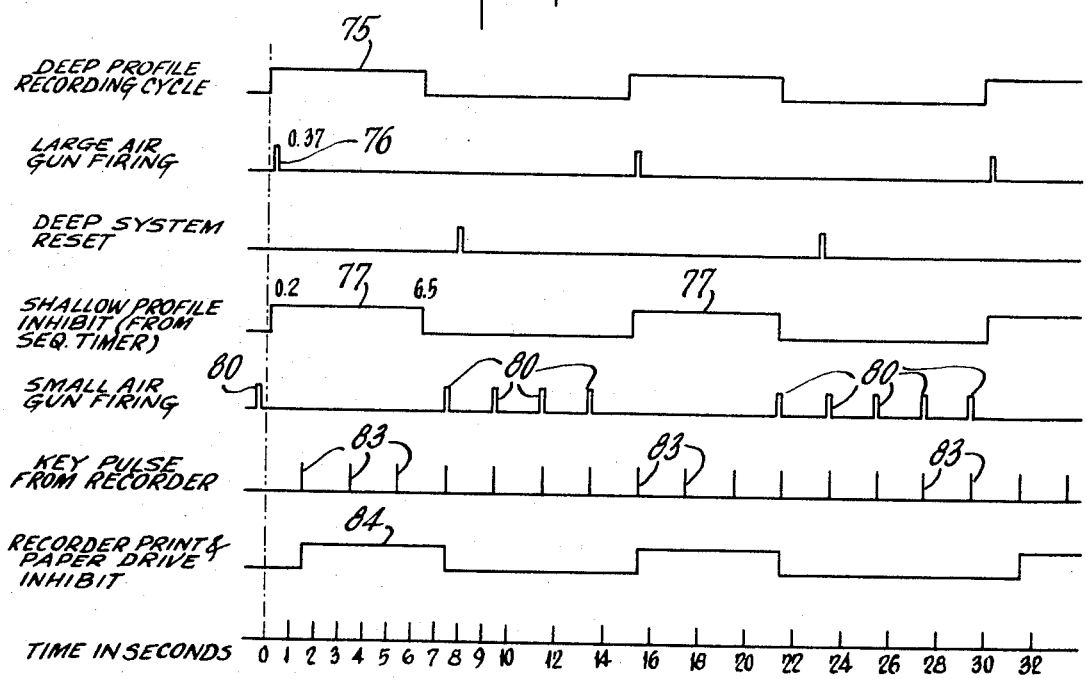
FIG. 4 is a timing diagram, illustrating the relationships between various of the control signals as a method, according to the invention, is carried out.

Now referring to the timing diagram of FIG. 4, this relates the various functions of the method to the elements illustrated and described above. Commencing at a given time during the operating cycles, e.g., vertical line marked O on the left-hand side of the FIG. 4 diagram, the leading edge of a deep profile recording cycle 75 may be employed. Such deep recording cycle will continue for a predetermined amount of time, which is between 6 and 6.5 seconds. Shortly after the beginning of that recording cycle, the large air gun charge is fired, as indicated by a pulse 76 on the second line of the timing diagram. This takes place at about 0.37 seconds. Just prior to that time, there is an inhibit signal 77 (see fourth line down, FIG. 4) generated commencing at 0.2 seconds and lasting until shortly after the end of the deep cycle 75, i.e., 6.5 seconds. The presence of this inhibit signal 77 acts to prevent small air gun firing so that no additional air-gun-discharge seismic signals will be generated during the inhibit signal time indicated by the signal 77. Such conditions are illustrated by small air gun firing pulses 80 on the fifth line down of the timing diagram.

It will be recalled that the recording unit 41 generates key pulses 83, and these are continuous because recorder unit 41 is continuously energized. Also, it is important to note that if a recording cycle of unit 41 has commenced with a small air gun firing as indicated by a pulse 80, the recording continues and the record paper drive is energized through the remainder of that cycle.

It may help to point out here that the recording unit is continuously energized, which means that the styli are always sweeping even though the printing on the record and the paper drive may be inhibited. Consequently, under the operating conditions indicated there is a key pulse 83 every sweep cycle, and only during the predetermined inhibit period, as shown by an inhibit signal 84, will the print and paper drive of the recording unit 41 be inhibited. The inhibit signal 84 as well as the event mark signal that creates event mark lines 57, both eminate from the sequence timer 60.

It will be appreciated that the sequence timer 60 might take various forms which form no part, per se, of the invention. For example, a sequence timer embodying the principles involved is illustrated and described in a U.S. Pat. to T. D. Nickerson No. 2,844,211 issued July 22, 1958.

An important feature of the invention is the ability to have some overlap of the shallow recording vis-a-vis the deep profile recording cycles. While it is important not to permit a small gun firing during the deep recording cycles, if a small gun firing has taken place, the shallow recording cycle which follows is permitted to continue to the end. It has been found that the large air gun firing, which under these circumstances happens during a shallow record, does not unduly interfere with the shallow records. This in spite of the fact that the inverse does not follow, i.e., it is important not to have any small air gun firing take place during a deep profile recording cycle.

The foregoing may be reviewed with reference to FIG. 4. Starting at the zero time vertical axis, it will be seen that the shallow recorder print and paper drive inhibit does not commence until after about 1½ seconds. However, shortly before the zero axis time there was a small air gun firing pulse 80 and, therefore, the recorder print and paper drive inhibit signal was not applied until the next key pulse 83 in order to give time to record the whole shallow record of the energy from the small gun. Then commencing with the next cycle, i.e., the first key pulse 83 illustrated, there is an inhibit signal 84 that will cut off the recording paper drive and the print energization during such inhibit time period. Thereafter, small air gun firings will again take place as illustrated by the group of four pulses 80. These are each followed by a shallow recording cycle in a continuous manner until the next shallow profile inhibit signal 77 which prevents additional small gun firings.

It will noted that in the foregoing manner no small gun firing (i.e., compressed-air discharge) is permitted during a deep profile recording cycle. However, a shallow record that has been commenced, may continue to the end thereof in spite of some overlap. This is feasible because the large air gun firing (compressed-air discharge) does not cause debilitating interference with the shallow record. The inverse does not hold true, because the small gun firings would occur a number of times during a deep recording cycle and would be apt to interfere with and mask reflection data contained in such deep recording. Therefore, small gun firings are always inhibited during the entire deep recording cycle. On the other hand, the shallow record cycles may continue to the end so long as the small air gun charge was not fired within the deep record cycle. In this manner it becomes possible to record an additional small charge cycle when the small air gun firing takes place shortly before the beginning of a deep recording cycle. Examples of the latter appear near the zero time axis of FIG. 4 and at about the thirty "second" line.

FIG. 5 illustrates a shallow profile recording which is a somewhat idealized showing, but which clearly indicates the manner of making such record. Thus, the illustration shows a record strip 88 that has the recordings thereon made by printing during sweeping of one of the three styli described above. These move across the strip 88 from top to bottom, as illustrated in FIG. 5. Seismic energy, as detected by the geophones in the group 30 (FIG. 3) is modified so as to create a series of electrical pulses that produce dark spots on the record paper whenever the pulse energy exceeds a given amplitude. This, then, records the charge firing first (near the top edge of the strip 88) and is followed by the seismic energy pulses that represent the arrivals at the detector group thereafter.

A profile recording is illustrated with time zero occurring near the top edge of strip 88 and time line divisions (not shown) being recorded at 25 millisecond intervals. A plurality of dark lines 90 are created as successive sweeps are recorded side by side with the record strip 88 advancing only enough to separate one trace from the next. Thus, the lines 90 are actually made up of series of dark spots occurring side by side when viewed as shown in FIG. 5. It is the idealizing of the drawing which makes them into continuous lines.

The recording unit 41 (FIG. 3) is constructed so that the event marks 57, described above and indicated by the numbers along the bottom edge of strip 88, may be created as desired to represent the time of any given event, which is the moment when a deep charge firing took place. The illustrated record has every sixth event marked.

An important advantage of this method of operating the recording unit 41 is that by inhibiting the record paper drive, no gaps are created on the recording, and a unitary record that improves correlation of the data, is had.

While a preferred embodiment has been described above in considerable detail in accordance with the applicable statutes, this is not to be taken as limiting the invention, but merely as being descriptive thereof.

What I claim is:

1. In offshore seismic exploration, a method of simultaneously and independently firing large energy deep-reflection profile shots, and firing and recording in continuous cycles small energy shallow-reflection profile shots without substantial interference of one with the other, comprising
    continuously energizing a shallow-reflection recording unit while stopping the record advance thereof whenever said small energy shots are inhibited,
    periodically firing said large energy charge in order to record deep-reflection records at time-controlled intervals and predetermined geographical locations during traverse of a predetermined profile line,
    continuously firing said small energy charge at predetermined relatively short constant intervals, except when inhibited, the inhibition occuring during a predetermined portion of each of the recordings of said deep-reflection records; and
    recording said shallow record shots for the entire short constant time interval after every small energy charge firing including any where said large energy shot is fired during such shallow record recording.

2. A method according to claim 1, wherein
    said continuous energizing includes generating a key pulse at the beginning of each scan of said recording unit.

3. A method according to claim 2, further comprising
    controlling said small energy charge firing from said key pulses, and
    inhibiting said small charge firing during the recording of said deep-reflection records.

4. A method according to claim 3, further comprising
    inhibiting said shallow record recording only during said complete intervals following said small charge firing inhibition.

5. A method according to claim 4, further comprising
    marking said shallow-reflection record to indicate the location of predetermined ones of said deep-reflection profile shots thereon.

6. In offshore seismic exploration, a method of recording a shallow profile from small gun firings without interfering with the separate recording of a deep profile, comprising the steps of
continuously energizing a shallow recording unit while stopping the record advance thereof whenever small gun firings are inhibited,
generating a series of key pulses from said energized unit,
providing a small gun firing pulse from each said key pulses unless said firing pulse is inhibited,
firing said small gun from each said firing pulses,
recording the seismic energy from each said small gun firing, and
inhibiting said small gun firing pulses only during said deep profile recordings.

7. A method according to claim 6, wherein said step of recording the seismic energy from small gun firings is continued until the next succeeding key pulse.

* * * * *